(12) United States Patent
Yamada et al.

(10) Patent No.: US 7,318,573 B2
(45) Date of Patent: Jan. 15, 2008

(54) SEAT SLIDING DEVICE

(75) Inventors: Yukifumi Yamada, Toyota (JP); Hideo Nihonmatsu, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 352 days.

(21) Appl. No.: 10/976,892

(22) Filed: Nov. 1, 2004

(65) Prior Publication Data

US 2005/0103968 A1 May 19, 2005

(30) Foreign Application Priority Data

Nov. 14, 2003 (JP) .............................. 2003-385505

(51) Int. Cl.
*F16M 13/00* (2006.01)
(52) U.S. Cl. ........................ 248/424; 248/429; 297/341
(58) Field of Classification Search ................ 248/424, 248/429, 430; 297/341, 344.1, 378.12
See application file for complete search history.

(56) References Cited

U.S. PATENT DOCUMENTS

| 4,707,030 | A | * | 11/1987 | Harding ...................... 297/341 |
| 5,407,165 | A | * | 4/1995 | Balocke ...................... 248/429 |
| 6,098,946 | A | | 8/2000 | Sechet et al. |
| 6,341,819 | B1 | * | 1/2002 | Kojima et al. ............... 297/341 |
| 6,354,553 | B1 | * | 3/2002 | Lagerweij et al. .......... 248/430 |
| 6,439,531 | B1 | * | 8/2002 | Severini et al. ............. 248/423 |
| 6,513,868 | B1 | * | 2/2003 | Tame ......................... 297/341 |
| 7,090,188 | B2 | * | 8/2006 | Severini et al. ............. 248/424 |

FOREIGN PATENT DOCUMENTS

JP 11-334431 12/1999

* cited by examiner

*Primary Examiner*—Carl D. Friedman
*Assistant Examiner*—Steven Marsh
(74) *Attorney, Agent, or Firm*—Buchanan Ingersoll & Rooney PC (57) ABSTRACT

A seat sliding device comprises a lower rail fixed at a stationary part and extending in a seat longitudinal direction, an upper rail fixed at a seat and slidably guided by the lower rail, a lock mechanism for locking and unlocking a slidable movement of the upper rail to the lower rail in order to adjust a position of the seat relative to the stationary part, the lock mechanism being attached at the upper rail, and a memory mechanism for returning the seat, which has moved to a forefront seat position from an occupant's seated position during a walk-in operation, to the occupant's seated position, the memory mechanism having a memory rail positioned at a distance from at least one of the lower rail and the upper rail and a memory slide configured to be fixed to the memory rail and to be slidably movable relative to the memory rail.

5 Claims, 6 Drawing Sheets

SEAT SLIDING DEVICE

CROSS REFERENCE TO RELATED APPLICATIONS

This application is based on and claims priority under 35 U.S.C. § 119 with respect to Japanese Patent Application 2003-385505, filed on Nov. 14, 2003, the entire content of which is incorporated herein by reference.

FIELD OF THE INVENTION

This invention generally relates to a vehicle seat sliding device capable of adjusting an axial directional position of a vehicle seat. More particularly, this invention pertains to a vehicle seat sliding device having a so-called walk-in mechanism for moving a vehicle seat from an occupant's seated position to a forefront seat position, thereby enhancing a getting on and off for an occupant at a back seat. The vehicle seat sliding device is configured with a memorizing mechanism for returning the vehicle seat already having moved to the forefront position to the occupant's seated position set before the walk-in operation.

BACKGROUND

JP No. 11(1999)-334431A discloses a seat sliding device having a seat sliding main body, a locking mechanism and a memorizing mechanism. The seat sliding main body is configured with a lower rail fixed at a vehicle floor and extending in a seat longitudinal direction and an upper rail fixed at a seat and slidably guided by the lower rail. The memorizing mechanism includes a memory slide, which is attached at the lower rail and can be switched between a slidable movement along the lower rail and a fixed condition thereto. The locking mechanism is attached at the upper rail and establishes a locked or unlocked condition between the upper rail and the lower rail. A cooperation of the locking mechanism and the memorizing mechanism enables a seat return from a seat position set after a seat walk-in movement to an occupant's seated position set before the seat walk-in movement.

However, in the aforementioned seat sliding device, each of the locking mechanism and the memorizing mechanism has been attached at an outer surface of the seat sliding main body. Therefore, an area for placing each mechanism at the seat sliding main body is constrained. Further, the number of components for the cooperation thereof may be increased, thereby causing a high manufacturing cost. Still further, the above-described structure may increase a lateral dimension of the seat sliding device, thereby narrowing a below space for an occupant to be seated at a rear seat.

Further, the lower rail is required to have an engaging hole for engaging the memory slide at the lower rail. This structure may deteriorate rigidity of the lower rail.

A need exists for providing an improved seat sliding device having a smaller lateral dimension, a fewer components and a memorizing mechanism with sufficient rigidity.

SUMMARY OF THE INVENTION

According to an aspect of a present invention, a seat sliding device comprises a lower rail fixed at a stationary part and extending in a seat longitudinal direction, an upper rail fixed at a seat and slidably guided by the lower rail, a lock mechanism for locking and unlocking a slidable movement of the upper rail to the lower rail in order to adjust a position of the seat relative to the stationary part, the lock mechanism being attached at the upper rail, and a memory mechanism for returning the seat, which has moved to a forefront seat position from an occupant's seated position during a walk-in operation, to the occupant's seated position, the memory mechanism having a memory rail positioned at a distance from at least one of the lower rail and the upper rail and a memory slide configured to be fixed to the memory rail and to be slidably movable relative to the memory rail.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be described herein below in detail with reference to the accompanying drawings.

Figure 1:
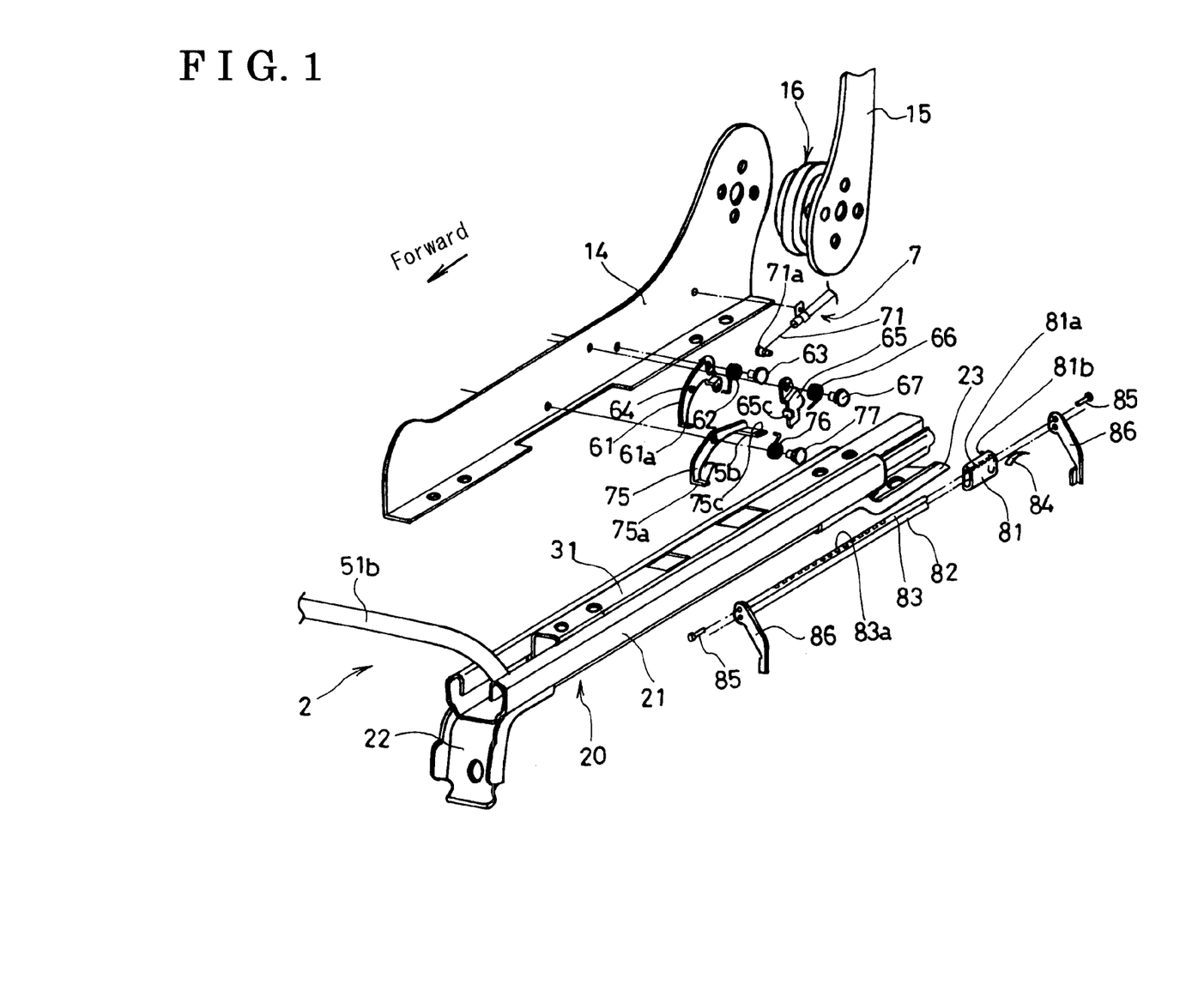
FIG. 1 is an exploded perspective view illustrating a seat sliding device according to an embodiment of the present invention.
Figure 2:
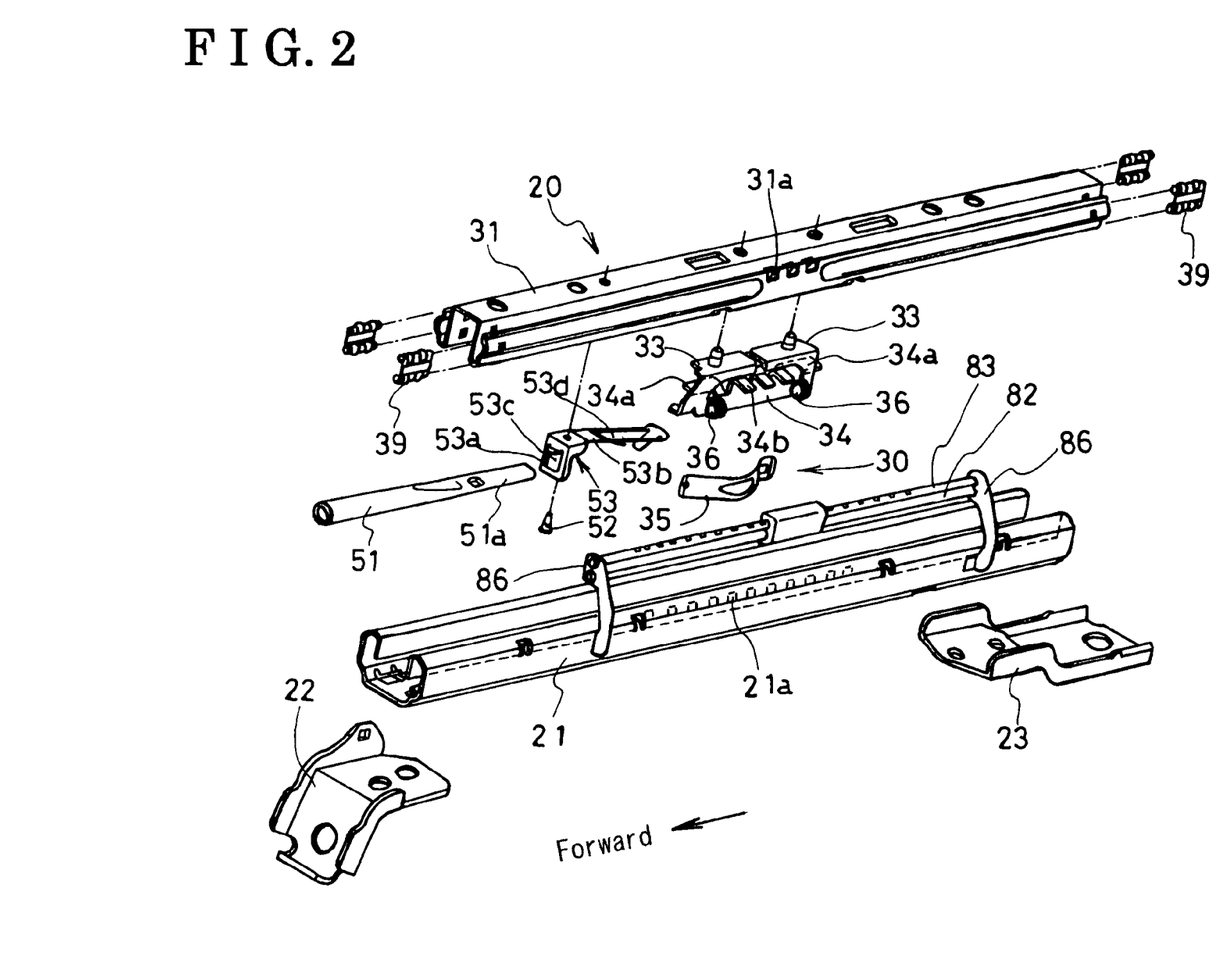
FIG. 2 is an exploded perspective view illustrating a seat sliding main body of the seat sliding device according to the embodiment of the present invention.
Figure 7:
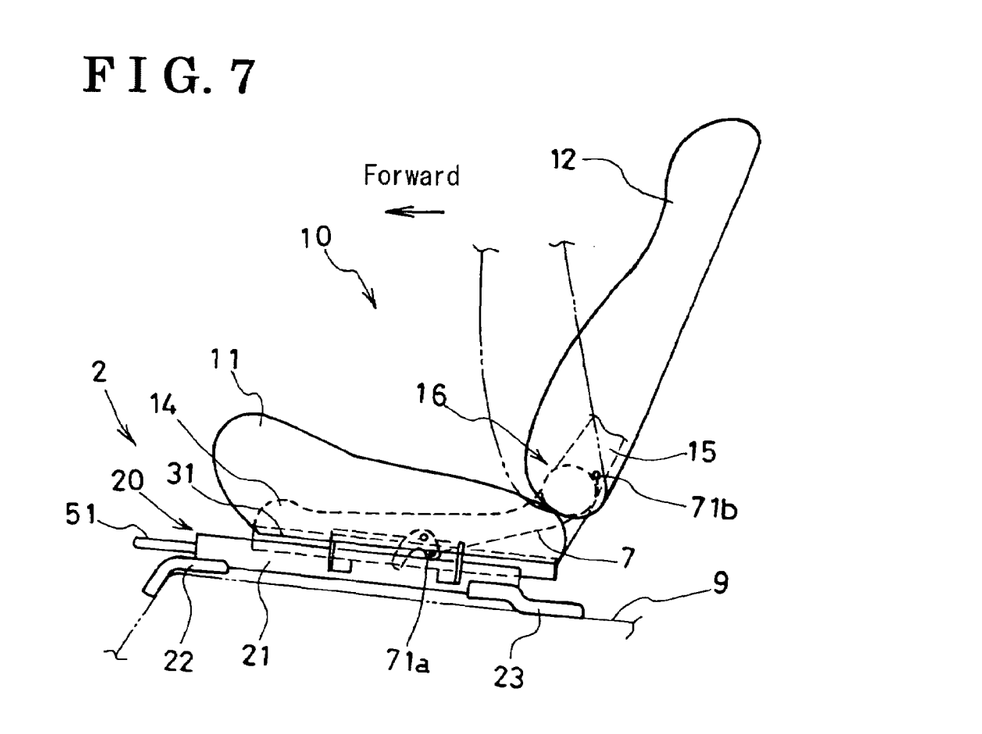
FIG. 7 is a side view illustrating a seat provided with the seat sliding device according to the embodiment of the present invention.

As illustrated in FIGS. 1, 2 and 7, a seat-sliding device 2 according to the embodiment of the present invention is provided with a seat sliding main body 20 having a lower rail 21 and an upper rail 31. The lower rail 21 is fixed at a vehicle floor 9 (shown in FIG. 7, i.e., stationary part) via a front bracket 22 and a rear bracket 23. The upper rail 31 is fixed at a seat 10 (shown in FIG. 9) and is slidably guided by the lower rail 21. Each lower and upper rail 21 and 31 extends in a seat longitudinal direction having a constant cross sectional shape in a seat lateral direction. At least one bearing 39 is disposed between the lower rail 21 and the upper rail 31 in order to smooth a sliding movement there between. Although the above description about the seat-sliding device 2 according to the embodiment of the present invention relies upon a single structure of each component, it is to be understood that the seat-sliding device 2 can have a pair of each component. Following explanation will rely upon the single structure of each component for simplifying the description.

A lower arm 14 is fixed at an upper surface of the upper rail 31 and is positioned at either center, left or right side of the seat 10, thereby supporting a seat cushion 11 on the upper rail 31. A reclining device 16 is provided at a rear end portion of the lower arm 14 to adjust a reclining angle of a seat back 12 relative to the seat cushion 11. An upper arm 15 fixed at the reclining device 16 supports the reclined seat back 12.

As illustrated in FIG. 2, the seat sliding main body 20 houses a lock mechanism 30 for locking and unlocking a slidable movement of the upper rail 31 relative to the lower rail 21. More particularly, the upper rail 31 has a reverse U-shaped cross section opening downwardly. The lock mechanism 30 is housed in this reverse U-shaped cross sectional area opening downwardly. The lock mechanism 30 is provided with a pair of holders 33 axially aligned below an under surface of an upper hem of the reverse U-shaped cross section of the upper rail 31. A lock pole 34 is equipped at the pair of holders 33 having a rotational shaft extending in the longitudinal direction. Since the lock pole 34 is equipped at the pair of holders 33 via balls 33, the lock pole 34 can be freely rotated. The lock pole 34 is provided with plural lock claws 34b aligned in the longitudinal direction at one end of the lock pole 34. The lock pole 34 is further provided with a pair of contact portions 34a aligned in the longitudinal direction at an opposite end of the lock pole 34 relative to fulcrums of the balls 36.

Figure 4:
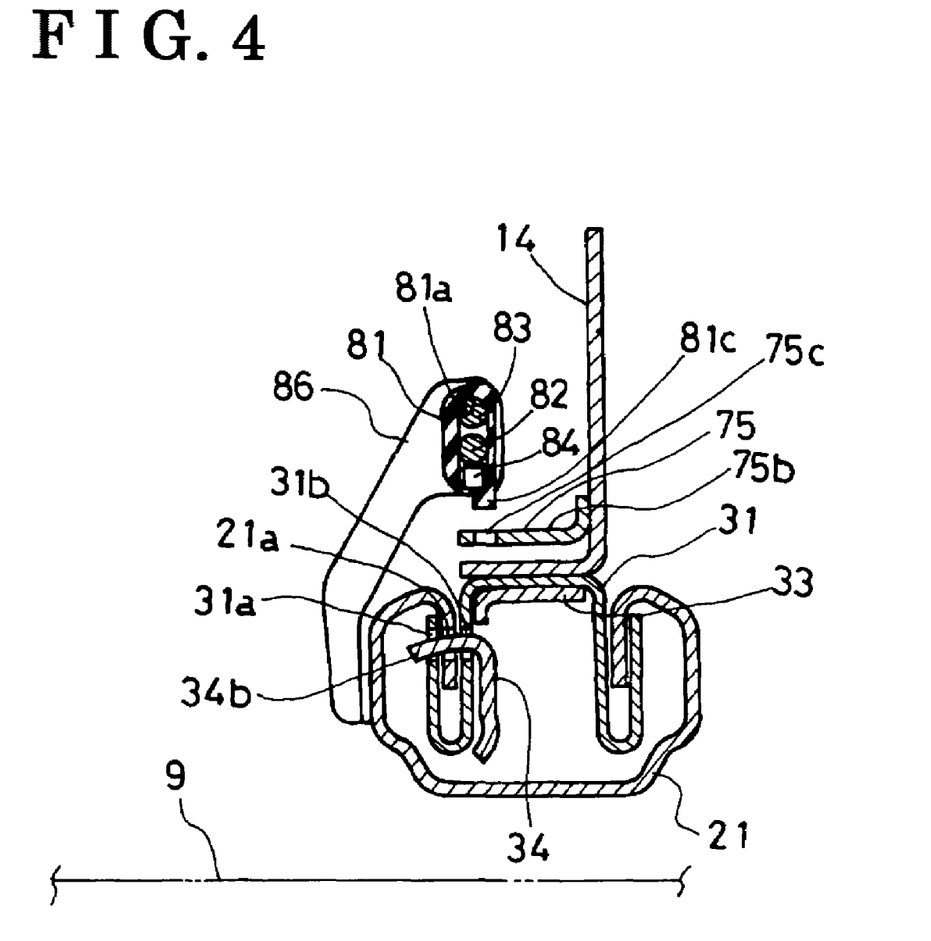
FIG. 4 is a sectional view taken along a line A-A in FIG. 3.

As being illustrated in more details in FIG. 4, tip ends of the respective lock claws 34b are bent laterally outwardly and penetrate engaging holes 31a and 31b defined at a flange of the upper rail 31 and engaging holes 21a defined at a flange of the lower rail 21. Therefore, the upper rail 31 can be positioned at an adjusted seat place relative to the lower rail 21. The lock mechanism 30 further includes a spring 35 (i.e., biasing means) for normally biasing the lock claws 34b in a direction to be engaged with the engaging holes 31a, 31b and 21a. According to the embodiment of the present invention, the spring 35 biases the lock claws 34b from a back face of the lock pole 34.

As illustrated in FIG. 2, a spring supporting member 53 is fixed at the under surface of the upper hem of the reverse U-shaped cross section of the upper rail 31 by a pin 52. A front end portion of the spring supporting member 53 extends downwardly and is integrated with a vertical piece 53a and a spring portion 53b. The vertical piece 53a has an oblong hole 53c. The spring portion 53b is made of an elastic member, extends rearward of the vertical piece 53a and has an oblong hole 53d. A rear end portion 51a of an operating lever 51 is inserted into the oblong holes 53c and 53d of the spring supporting member 53. As illustrated in FIG. 1, a front end portion of the operating lever 51 defines an operating portion 51b extending in the lateral direction of the seat 10.

Figure 6:
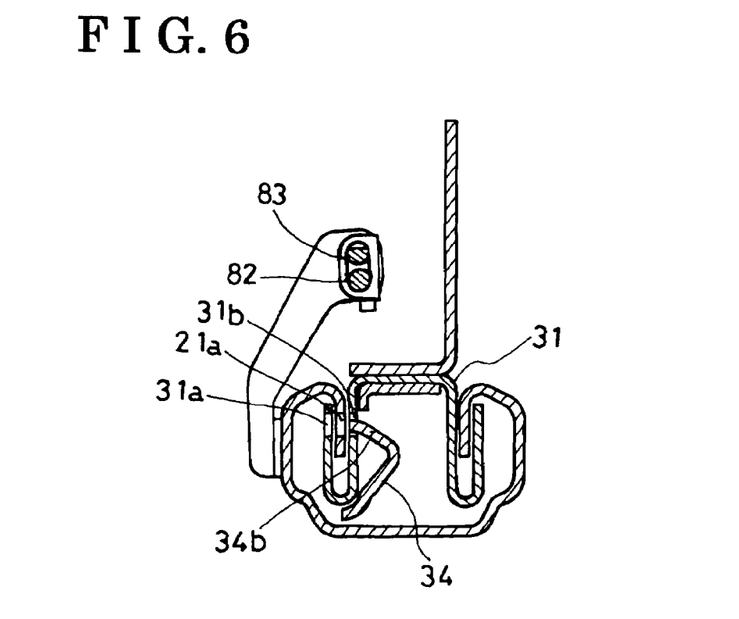
FIG. 6 is a sectional view taken along a line B-B in FIG. 5.

The operating lever 51 is biased to be lifted up by the spring portion 53b with a fulcrum of the oblong hole 53c so that the rear end portion 51a of the operating lever 51 comes in contact with the under surface of the upper hem of the upper rail 31. Therefore, the operating portion 51b always sits downwardly under the aforementioned condition. When the operating portion 51b sitting downwardly is lifted up against the biasing force of the spring portion 53b, the rear end portion 51a is lifted down and pushes the front-side contact portion 34a of the lock pole 34 downwardly. In response to the lift-down operation of the rear end portion 51a, the lock pole 34 rotates in a clockwise direction in FIG. 4 with the fulcrums of the balls 36. Therefore, the lock claws 34b are released from the engagement condition with the engaging holes 31a, 31b and 21a as illustrated in FIG. 6.

As illustrated in FIGS. 1 and 7, a cable 7 is equipped to the lower arm 14 to be operated in conjunction with the frontward reclining movement of the seat back 12. A wire 71 of the cable 7 is connected to one end of a release link 61, which is freely rotatably provided at the lower arm 14 by a pin 63, via a terminal 71a of a bottom end of the wire 71. An upper end of the wire 71 is equipped with a terminal 71b (illustrated in FIG. 7) and is connected to the upper arm 15. When the seat back 12 is reclined at the forefront reclining position illustrated with a chain double-dashed line illustrated in FIG. 7, the terminal 71b of the upper end of the wire 71 is pulled upwardly.

Figure 5:
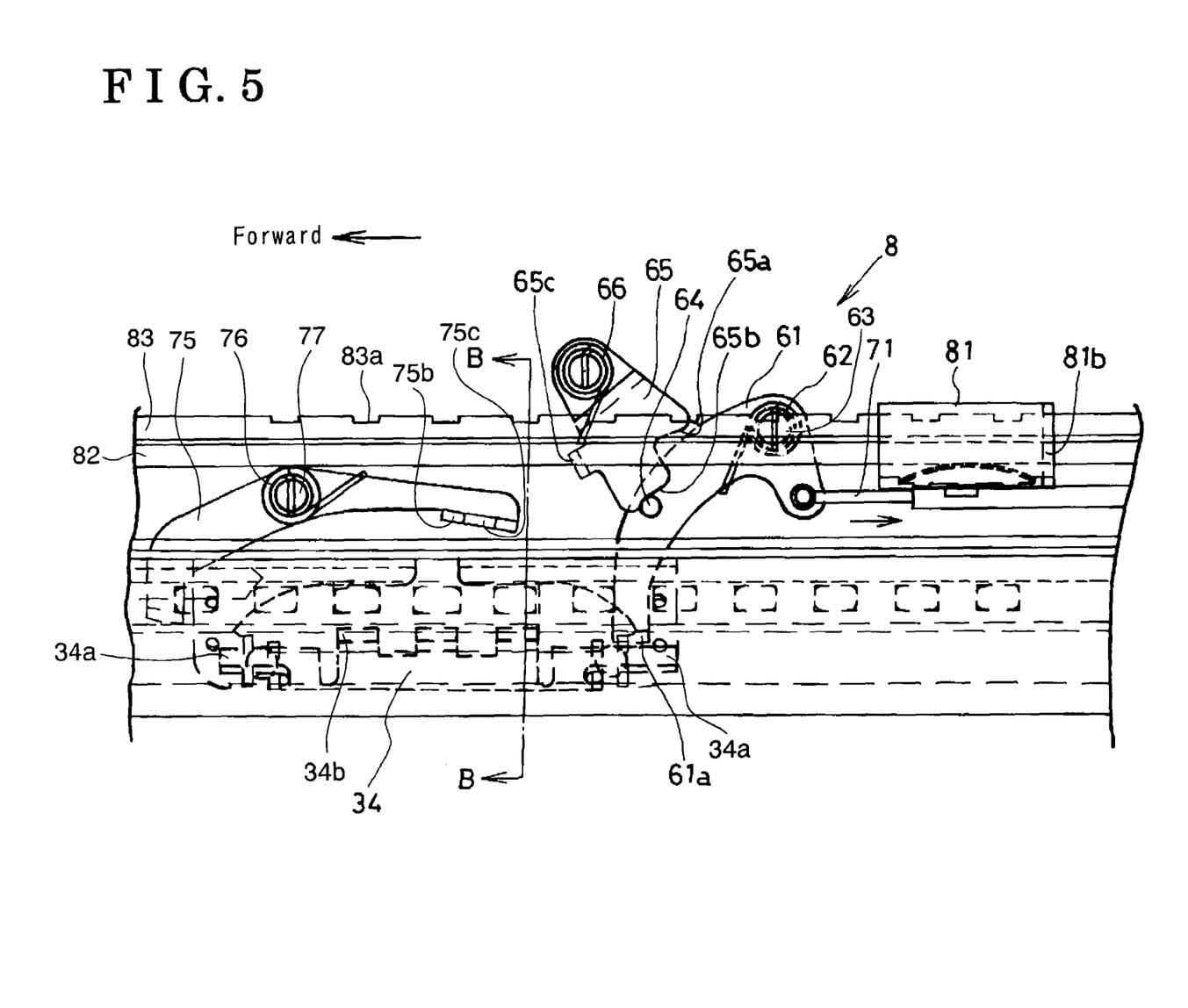
FIG. 5 is the other partially enlarged view illustrating the mechanism of the seat sliding device according to the embodiment of the present invention.

As illustrated in FIG. 5, the other end of the release link 61 extends downwardly and is integrally provided with a contact end 61a that can come in contact with the rear-side contact portion 34a of the lock pole 34. The release link 61 is biased in the clockwise direction by a spring 62 disposed between the pin 63 and the release link 61. Therefore, the contact end 61a is always applied with the biasing force to get away from the contact portion 34a by the spring 62. Once the terminal 71b of the cable 7 is pulled upwardly when the seat back 12 reaches the forefront reclining position, the terminal 71a of the cable 7 is pulled rightward in FIG. 5, i.e., in the rearward direction of the seat 10. In this case, the release link 61 rotates in a counterclockwise direction against the biasing force of the spring 62. Therefore, the contact portion 34a is pushed downwardly by the contact end 61a so that the lock claws 34b of the lock pole 34 are released from being engaged with the engaging holes 31a, 31b and 21a as illustrated in FIG. 6.

Figure 3:
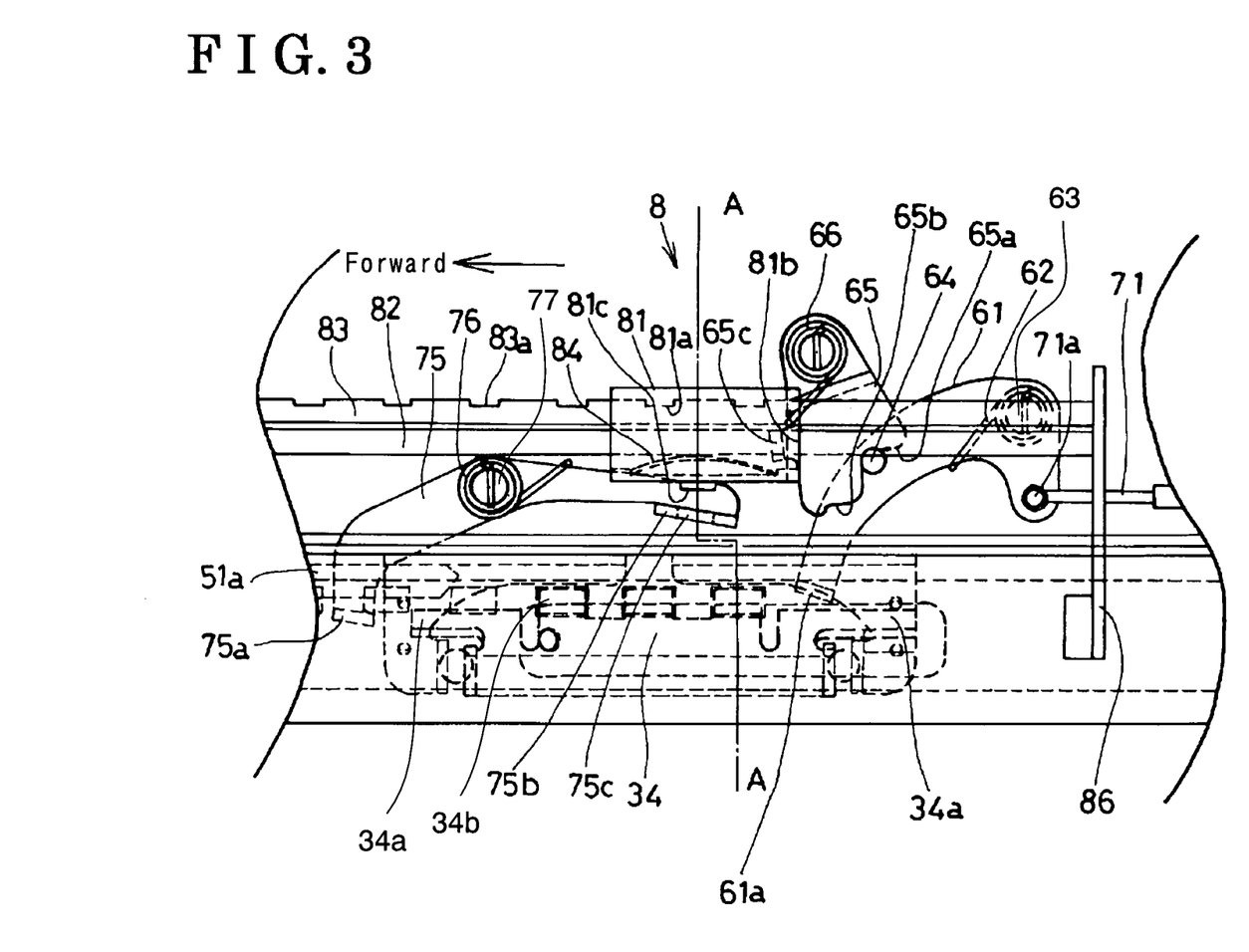
FIG. 3 is a partially enlarged view illustrating a mechanism of the seat sliding device according to the embodiment of the present invention.

As illustrated in FIGS. 1, 3 and 5, an engaging pin 64 is fixed at a side surface of the release link 61 projecting laterally. A hold link 65 is connected to the side surface of the lower arm 14 to be freely rotated by a pin 67. The hold link 65 is always biased in the counterclockwise direction in FIG. 3 by a spring 66. A downwardly extending portion of the hold link 65 is integrated with a first engagement surface 65a and a second engagement surface 65b. The pin 67 is more adjacent to the first engagement surface 65a rather than the second engagement surface 65b.

As illustrated in FIG. 3, when the terminal 71a of the cable 7 has not been pulled rightward, the engagement pin 64 is supported at the first engagement surface 65a, wherein the release link 61 does not release the lock claws 34b of the lock pole 34 from being engaged with the engaging holes 31a, 31b and 21a. When the seat back 12 reaches the forefront inclining position, the engagement pin 64 is supported at the second engagement surface 65b in response to the counterclockwise directional rotation of the release link 61, as illustrated in FIG. 5. Therefore, the release link 61 is maintained at a position for releasing the lock claws 34b from being engaged with the engaging holes 31a, 31b and 21a. That is, the release link 61 is maintained at a position for unlocking the lock mechanism 30. When the seat back 12 reaches the forefront reclining position, there is not an occupant seated on the seat cushion 11. Therefore, when the lock mechanism 30 is unlocked, the seat 10 can be easily moved to the forefront seat position by a force of a spring (not shown) provided at the seat sliding device 2, i.e., an walk-in operation of the seat 10 can be achieved.

Next, following explanation will be given for explaining a memory mechanism 8 with reference to FIGS. 1, 3 and 5. The memory mechanism 8 includes a memory link 75 (i.e., first link), the release link 61 (i.e., second link) and the hold drink 65.

A walk-in mechanism is implemented for moving the seat 10 from the occupant's seated position to the forefront seating position when the seat back 12 is inclined forward, thereby enabling to making easier for the occupant to getting on and off the rear seat. The memory mechanism 8 is operated for returning the seat 10 from the forefront seating position to the occupant's seated position set before the walk-in operation after the occupant has seated at the rear seat.

As illustrated in FIGS. 1 and 2, a pair of supporting brackets 86 vertically extending is attached at a side surface of the lower rail 21 via bottom ends of the pair of supporting brackets 86. The pair of supporting brackets 86 is positioned with a predetermined distance there between in the longitudinal direction. Memory rails 82 and 83 extend in the longitudinal direction and are connected to the supporting brackets 86 via screws 85 in parallel with the lower rail 21. The memory rail 82 is at the vertically downside of the memory rail 83 and extends substantially in parallel with the memory rail 83. The memory rail 83 is integrally provided with plural notches 83a, each of which has substantially the same amount of distance there between as the distance of each engaging hole 21a of the lower rail 21.

A memory slide 81, which has a shape surrounding the memory rails 82 and 83, is slidably attached to the memory rails 82 and 83. Plural convex portions 81a are integrally provided at an inner peripheral surface of the memory slide 81. The plural convex portions 81a can be engaged with the notches 83a. According to the embodiment of the present invention, a spring 84 is disposed inside the memory slide 81 for normally biasing the memory slide 81 downwardly so that the convex portions 81a can be reliably engaged with the notches 83a. When the convex portions 81a of the memory slide 81 have been engaged with the notches 83a, the slidable movement of the memory slide 81 is restrained. In the meantime, when the convex portions 81a of the memory slide 81 has been disengaged from the notches 83a, the memory slide 81 is guided by the memory rails 82 and 83 and is moved in the longitudinal direction.

As described above, according to the embodiment of the present invention, the memory slide 81 is configured separately from the seat sliding main body 20. Therefore, the memory slide 81 can be disposed in a space between the seat 10 and the seat sliding device 2. Further, the lateral dimension of the seat sliding device 2 can be narrowed without narrowing the below space of the occupant to be seated at the rear seat. Still further, the lower rail 21 is not required to have an engaging hole for engaging the memory slide 81, thereby not causing the deterioration of rigidity of the lower rail 21.

As illustrated in FIG. 1, the memory link 75 is freely rotatably equipped at the side surface of the lower arm 14 by a pin 77 in adjacent to the release link 61 and the hold link 65. The memory link 75 is biased in the clockwise direction in FIG. 3 by a spring 76. A forwardly extending portion of the memory link 75 relative to the pin 77 is integrated with a contact portion 75a, which is positioned at a downside of the rear end portion 51a of the operating lever 51 and extends in the seat lateral direction. When the operating portion 51b of the operating lever 51 is lifted up, the contact portion 34a is pushed downwardly in response to the downward movement of the rear end portion 51a of the operating portion 51. A rearward extending portion of the memory link 75 relative to the pin 77 is integrated with an engaging portion 75b, which is positioned at a downside of the memory slide 81 and extends in the seat lateral direction. When the rear end portion 51a of the operating portion 51 is moved downwardly, the contact portion 75a of the memory link 75 is pushed downwardly. The memory link 75 then rotates in the counterclockwise direction in FIG. 3 about the pin 77. In this case, the engaging portion 75b is lifted upwardly and lifts up the bottom portion of the memory slide 81. The convex portions 81a of the memory slide 81 are disengaged from the notches 83a of the memory rail 83. Therefore, the memory slide 81 can be slidably moved in the longitudinal direction. As illustrated in FIG. 3, the memory slide 81 is integrally provided with a projection 81c at a bottom side thereof. The engaging portion 75b has a hole 75c. When the convex portions 81a are disengaged from the notches 83a, the projection 81c is inserted into the hole 75c so that the memory slide 81 is slidably moved integrally with the memory link 75.

As described above, according to the embodiment of the present invention, the lock mechanism 30 and the memory mechanism 8 are positioned above the seat sliding main body 20, thereby operating the lock mechanism 30 in conjunction with the memory mechanism 8, vice versa, with a fewer components and assuring the below space of the occupant seated at the rear seat.

According to the embodiment of the present invention, the seat sliding device 2 with the above-described structure is operated as described below.

When the seat position is adjusted under a condition that the occupant is seated therein, the operating portion 51b of the shift lever 51 is lifted up, i.e., the rear end portion 51a is lifted down. The lifted-down rear end portion 51a pushes the contact portion 34a of the lock pole 34 downwardly. The lock claws 34b of the lock pole 34, which project in an opposite lateral direction to the projected contact portions 34a, are lifted up. Therefore, the lock claws 34b of the lock pole 34 are disengaged from the engaging holes 31a and 32b of the upper rail 31 and the engaging holes 21a of the lower rail 21, and so the upper rail 31 is freely moved in the longitudinal direction relative to the lower rail 21. When the occupant stops lifting up the operating portion 51b after moving the seat 10 at a desired seat position, a counter operation of the above-described operation is implemented. That is, the upper rail 31 and the lower rail 21 are locked again so that the seat 10 can be maintained at the desired seat position.

Especially, when the operating portion 51b of the shift lever 51 is lifted up, the rear end portion 51a is lifted down. The lifted-down rear end portion 51a pushes the contact portion 75a of the memory link 75 downwardly as well. The contact portion 75b of the memory link 75 is lifted up in response to the lift-down of the contact portion 75a and lifts up the memory slide 81. The convex portions 81a of the memory slide 81 is then disengaged from the notches 83a of the memory rail 83. The projection 81c of the memory slide 81 is inserted into the hole 75c of the contact portion 75a of the memory link 75, and so the memory slide 81 is integrally moved with the memory link 75. When the seat 10 is positioned at a new desired seat position, the convex portions 81 of the memory slide 81 are engaged with the notches 83a of the memory rail 83 when the operation of the operating portion 51b is stopped. Therefore, the memory slide 81 is fixed at the memory rails 82 and 83.

When the seat back 12 reaches the forefront inclining position, the wire 71 of the cable 7 is pulled upwardly, and so the terminal 71a of the release link 61 is pulled in the rightward direction in FIG. 3. The release link 61 is then rotated in the counterclockwise direction in FIG. 5 about the pin 63. Therefore, the contact portion 61a of the release link 61 pushes the contact portion 34a of the lock pole 34 downwardly. The lock claws 34b of the lock pole 34, which project in an opposite lateral direction to the projected contact portions 34a, are lifted up. Therefore, the lock claws 34b are disengaged from the engaging holes 31a, 31b and 21a. However, the memory slide 81 is maintained at the engaged condition with the memory rail 83. That is, the seat 10 can be easily moved to the forefront seat position by the spring (not shown) disposed at the seat-sliding device 2. In this case, the hold link 65 fixed at the lower arm 14 is moved forward in response to the forward movement of the seat 10, while the memory slide 81 is not moved and remains as it is. As a result, as illustrated in FIG. 5, the hold link 65 is moved away from the memory slide 81.

When the seat 10 is returned to the occupant's seated position from the forefront seat position, the release link 61 has been already maintained at a position for unlocking the lock pole 34, as illustrated in FIG. 5. The seat 10 can be hence returned to the position with no constrain. As the hold link 65 approaches the memory slide 81, a contact portion 65c of the hold link 65 comes in contact with a contact portion 81b of the memory slide 81. In this case, the hold link 65 is rotated in the clockwise direction from the condition illustrated in FIG. 5. The engaging pin 64 of the release link 61 is moved from the contact condition with the second engagement surface 65b of the hold link 65 to the contact condition with the first engagement surface 65a of the hold link 65. The release link 61 rotates by the spring 62 about the pin 63 as illustrated in FIG. 5. The contact portion 61a of the release link 61 is lifted up and returns to the original position. In this case, the lock claws 34b are engaged with the engaging holes 31a, 31b and 21a. As described above, the lock pole 34 returns to the locked condition as illustrated in FIG. 4. The memory slide 81 has remained at a position set immediately before the walk-in operation. Therefore, the lock pole 34 can be locked again at a position set immediately before the walk-in operation, thereby enabling to return the seat 10 to the position set immediately before the walk-in operation, i.e., to the occupant's seated position, with high reliability.

The principles, an embodiment and modes of operation of the present invention have been described in the foregoing specification and drawings. However, the invention which is intended to be protected is not to be construed as limited to the particular embodiments disclosed. Further, the embodiments described herein are to be regarded as illustrative rather than restrictive. Plural objectives are achieved by the present invention, and yet there is usefulness in the present invention as far as one of the objectives are achieved. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat sliding device comprising:
 a lower rail fixed at a stationary part and extending in a seat longitudinal direction;
 an upper rail fixed at a seat and slidably guided by the lower rail;
 a lock mechanism for locking and unlocking a slidable movement of the upper rail to the lower rail in order to adjust a position of the seat relative to the stationary part, the lock mechanism being attached at the upper rail;
 a memory mechanism for returning the seat, which has moved to a forefront seat position from an occupant's seated position during a walk-in operation, to the occupant's seated position, the memory mechanism having a memory rail positioned at a distance from at least one of the lower rail and the upper rail and a memory slide configured to be fixed to the memory rail and to be slidably movable relative to the memory rail, the memory mechanism positioned above at least one of the lower rail and the upper rail; and
 a link mechanism arranged between the lock mechanism and the memory mechanism so as to activate the memory mechanism by operation of the lock mechanism, the link mechanism being supported on the upper rail and positioned above at least one of the lower rail and the upper rail.

2. A seat sliding device [according to claim 1, wherein the memory mechanism comprises] comprising:
 a lower rail fixed at a stationary part and extending in a seat longitudinal direction;
 an upper rail fixed at a seat and slidably guided by the lower rail;
 a lock mechanism for locking and unlocking slidable movement of the upper rail to the lower rail in order to adjust a position of the seat relative to the stationary part, the lock mechanism being attached at the upper rail;
 a memory mechanism for returning the seat, which has moved to a forefront seat position from an occupant's seated position during a walk-in operation, to the occupant's seated position, the memory mechanism having a memory rail positioned at a distance from at least one of the lower rail and the upper rail, a memory slide configured to be fixed to the memory rail and to be slidably movable relative to the memory rail;
 a first link for releasing an engagement between the memory slide with the memory rail in association with adjustment of the seat position;
 a second link for releasing the lock mechanism from locking the slidable movement of the upper rail to the lower rail in response to a forward inclination of a seat back; and
 a hold link for holding the second link at a releasing position for releasing the lock mechanism for the walk-in operation of the seat and for holding the second link at a position for operating the lock mechanism along with the memory slide when the seat is returned to the occupant's seated position,
 wherein the first link, the second link and the hold link are positioned above at least one of the lower rail and the upper rail.

3. A seat sliding device according to claim 2, wherein the second link is connected to the seat back by a wire.

4. A seat sliding device according to claim 2, wherein the memory slide has a projection at a bottom thereof, the first link is provided with a contact portion having a hole, and the first link is moved integrally with the memory slide when the projection is inserted into the hole.

5. A seat sliding device according to claim 2, wherein the memory slide has a projection at a bottom thereof, the first link is provided with a contact portion having a hole, and the first link is moved separately from the memory slide staying at the memory rail when the projection is not inserted into the hole.

* * * * *